United States Patent
Oshins et al.

(10) Patent No.: US 7,284,083 B2
(45) Date of Patent: Oct. 16, 2007

(54) DYNAMICALLY CONFIGURING RESOURCES FOR CYCLE TRANSLATION IN A COMPUTER SYSTEM

(75) Inventors: Jacob Oshins, Seattle, WA (US); Stephane G. Plante, Kirkland, WA (US); Andrew J. Thornton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/114,954

(22) Filed: Apr. 25, 2005

(65) Prior Publication Data

US 2005/0198596 A1  Sep. 8, 2005

Related U.S. Application Data

(63) Continuation of application No. 09/558,469, filed on Apr. 24, 2000, now Pat. No. 6,970,957.

(51) Int. Cl.
*G06F 1/00* (2006.01)

(52) U.S. Cl. .................... 710/315; 710/11; 710/16; 710/104; 710/107

(58) Field of Classification Search ........ 710/300–315, 710/104–110, 8–19, 36–38, 60–61, 66
See application file for complete search history.

(56) References Cited

U.S. PATENT DOCUMENTS

| | | | | |
|---|---|---|---|---|
| 5,751,975 A | | 5/1998 | Gillespie et al. ............ 710/315 |
| 5,875,313 A | * | 2/1999 | Sescila et al. ............... 710/305 |
| 5,884,027 A | * | 3/1999 | Garbus et al. ............... 709/250 |
| 5,890,011 A | | 3/1999 | Abbondanzio et al. ....... 710/72 |
| 5,903,894 A | * | 5/1999 | Reneris ...................... 707/100 |
| 5,937,175 A | | 8/1999 | Sescila, III et al. ......... 710/306 |
| 5,999,730 A | | 12/1999 | Lewis ........................ 717/109 |
| 6,167,511 A | | 12/2000 | Lewis ............................ 713/2 |
| 6,185,677 B1 | | 2/2001 | Nijhawan ...................... 713/2 |
| 6,339,808 B1 | * | 1/2002 | Hewitt et al. ............... 710/260 |
| 6,462,745 B1 | * | 10/2002 | Behrbaum et al. .......... 345/543 |
| 6,581,130 B1 | * | 6/2003 | Brinkmann et al. ........ 710/306 |
| 6,589,169 B1 | | 7/2003 | Surwit et al. ............... 600/300 |
| 6,591,358 B2 | * | 7/2003 | Jaffrey ......................... 712/32 |
| 6,636,901 B2 | * | 10/2003 | Sudhakaran et al. ........ 719/327 |
| 6,915,365 B2 | * | 7/2005 | Creta et al. ................. 710/104 |
| 6,931,646 B2 | * | 8/2005 | Dubal ........................ 719/327 |
| 2004/0215867 A1 | * | 10/2004 | Kuo ........................... 710/306 |

* cited by examiner

*Primary Examiner*—Khanh Dang
*Assistant Examiner*—Raymond N Phan
(74) *Attorney, Agent, or Firm*—Workman Nydegger

(57) ABSTRACT

A method and system that enables customized computer machines to be more readily developed by removing the function of resource translation out of the hardware abstraction layer (HAL). A machine manufacturer describes a machine in firmware, such as accordance with the Advanced Configuration and Power Interface (ACPI) specification, using ACPI machine language (AML). Operating system components such as a Plug and Play (PnP) manager in the kernel, in conjunction with an ACPI driver, interpret the description information and locate resources (bus bridges) for which translation is needed. For any arbitrary bus architecture or CPU to PCI bridge implementation that can be expressed, e.g., in ACPI firmware, the invention provides a translator external to the HAL. In one implementation, a PnP driver communicates with the ACPI driver and various drivers in driver stacks via I/O request packets (IRPs) to look for resource translators. The ACPI driver analyzes the machine description and returns a translator if found for such a resource. The resource is then configured to output cycles based on the translator.

20 Claims, 8 Drawing Sheets

DYNAMICALLY CONFIGURING RESOURCES FOR CYCLE TRANSLATION IN A COMPUTER SYSTEM

CROSS-REFERENCE TO RELATED APPLICATION

This is a continuation of U.S. patent application Ser. No. 09/558,469 filed Apr. 24, 2000, now U.S. Pat. No. 6,970,957.

FIELD OF THE INVENTION

The present invention relates generally to computer devices, and more particularly to computer software for facilitating the development of customized computer hardware.

BACKGROUND OF THE INVENTION

The Hardware Abstraction Layer, or HAL, is a complex part at a low layer of the Windows® 2000 (or Windows NT®) operating system that abstracts hardware differences among various system architectures from higher layers of software. The HAL enables higher-level operating system components and drivers to communicate with the system hardware without modification, i.e., the HAL enables a single driver to support the same hardware device on multiple platforms. For example, one of the many tasks performed by the HAL is resource translation, wherein on certain (e.g., non-x86) processors that can only read and write in memory cycles, certain CPU-relative memory cycles are translated to bus-relative cycles (I/O or other memory address), and vice-versa, so that devices can respond to (decode) the cycle.

A HAL performs many functions, and a reliable HAL is critical to a properly operating computer machine. It is thus an extremely complex piece of software code to develop. Indeed, the contemporary cost to write, test and debug a HAL may be on the order of several millions of dollars. It is impractical for an operating system vendor to write a new HAL for each new machine that is developed, and machine vendors thus need to fit new machines into one of the broad categories covered by one of the several HAL implementations currently available, or write their own HAL for a machine that is not covered. However, because of the cost and complexity reasons, only a few, very large original equipment manufacturers have attempted to write a HAL to attempt to support a new class of machines, with mixed results. As a result, most equipment manufacturers are limited to providing classes of computer systems that are capable of working with an already-existing HAL. In general, however, manufacturers would like to develop customized machines that are not limited by existing HALs, yet without going through the expensive and unpredictable ordeal of writing a customized HAL for each new customized class of machine.

SUMMARY OF THE INVENTION

Briefly, the present invention provides a method and system that removes the function of resource translation out of the HAL. This enables customized machines to be more readily developed, as instead of requiring an entire HAL to provide resource translation, the resource translator may be dynamically determined for each particular piece of hardware.

To this end, in one described implementation, a machine manufacturer describes a machine in firmware, such as in accordance with the Advanced Configuration and Power Interface (ACPI) specification, using ACPI machine language (AML). Operating system components such as the Windows Driver Model (WDM) Plug and Play (PnP) Manager in the kernel, in conjunction with an ACPI driver, interpret the description information and locate resources for which translation is needed. For any arbitrary bus architecture or CPU to PCI bridge implementation that can be expressed, e.g., in ACPI firmware, the invention provides a translation mechanism that tells a device driver (at the time that the device driver is brought into service) what CPU cycles to issue in order to cause an appropriate I/O cycle on the bus that contains the driver's device. This is done based on the firmware information, and outside of the HAL, to abstract hardware differences among various system architectures from higher layers of software.

In one implementation, when the ACPI driver is enumerated at system startup, the ACPI driver examines and interprets the AML in the ACPI firmware to build a hierarchical namespace. The kernel (PnP) communicates with the various drivers in driver stacks via I/O request packets (IRPs) to look for resource possibly needing translation. When such a driver is found, an IRP reaches an ACPI driver in a driver stack, and the ACPI driver looks at the _CRS of the PCI Host bus in the ACPI namespace and sees if any items have a translation value to determine whether the resource requires translation. If so, the ACPI driver uses the IRP to hand back a translator (a table of functions) to the kernel (e.g., the PNP manager therein) to configure the driver to enable the translation, i.e., such that the device driver knows what CPU cycles to issue in order to cause an appropriate I/O cycle on the bus that contains the driver's device.

Other advantages will become apparent from the following detailed description when taken in conjunction with the drawings, in which:

DETAILED DESCRIPTION

Copyright Notice

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Exemplary Operating Environments

Figure 1:
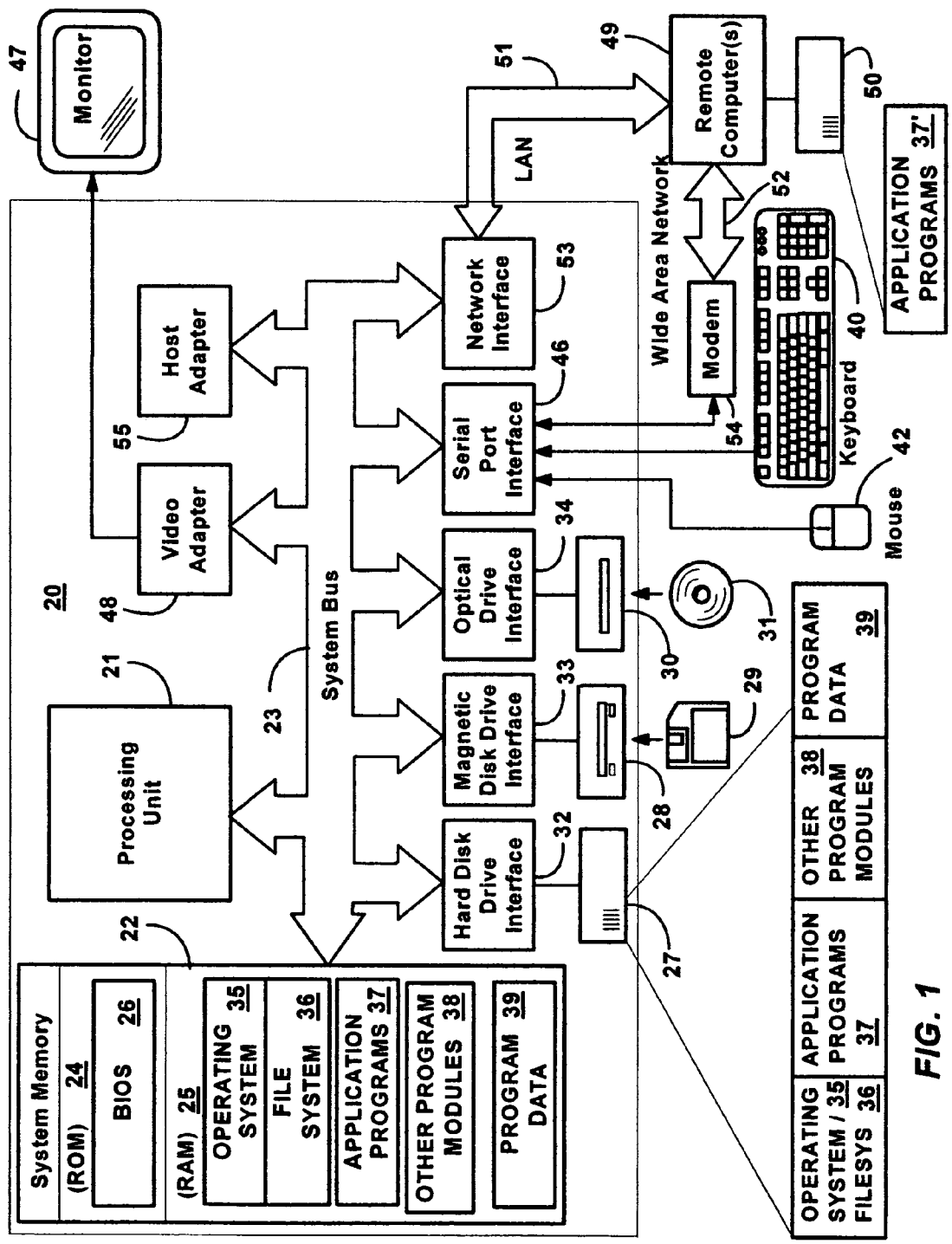
FIG. 1 is a block diagram representing an exemplary computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
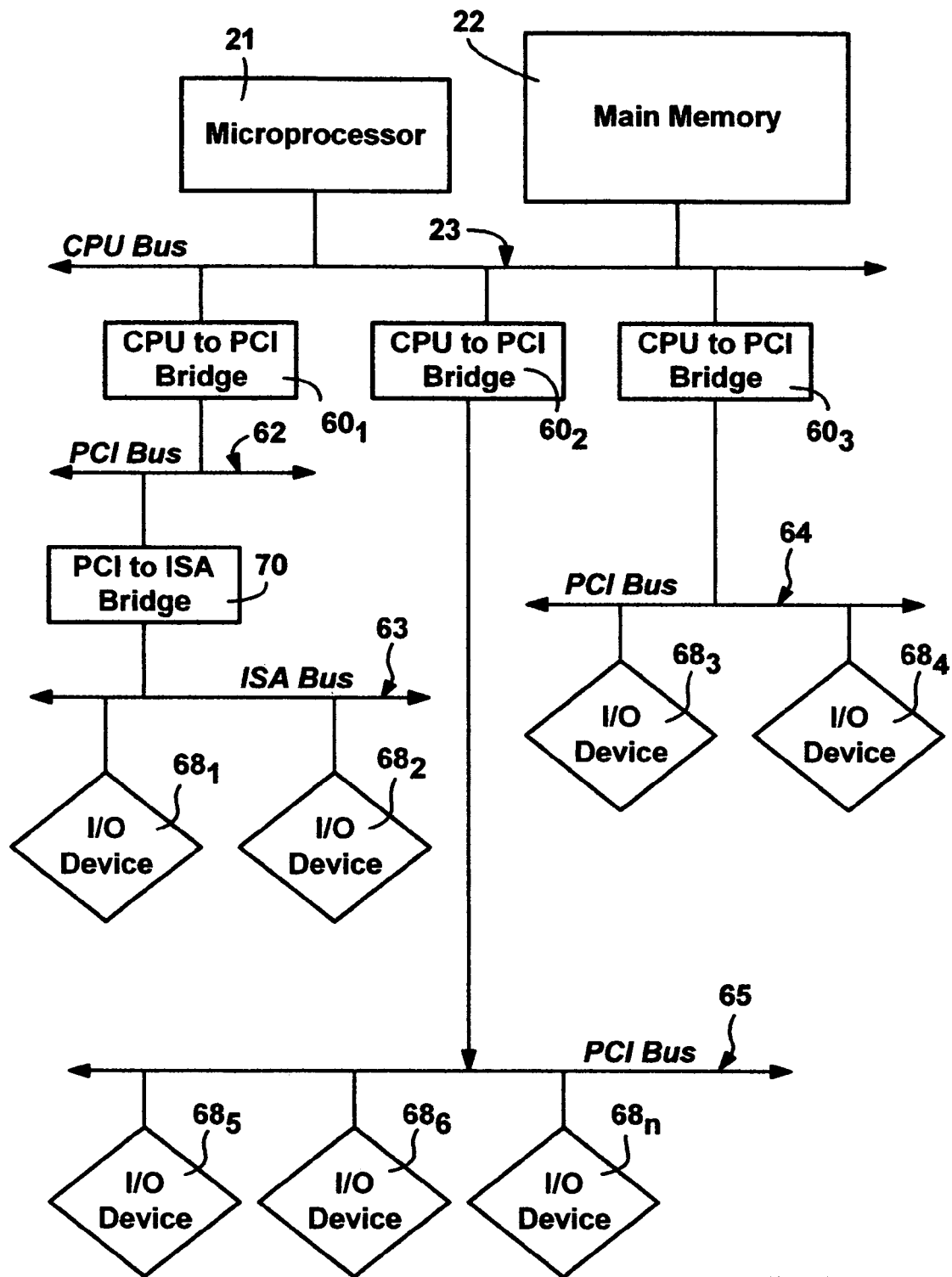
FIG. 2 is a block diagram representing an exemplary computer system having a number of busses with bridges between some of the busses and devices attached thereto in which the present invention may be implemented.

With reference to FIG. 1, an exemplary system for implementing the invention includes a general purpose computing device in the form of a conventional personal computer 20 or the like, including a processing unit 21, a system memory 22, and a system (CPU) bus 23 that couples various system components including the system memory to the processing unit 21. The system bus 23 may be any of several types of bus structures including a memory bus or memory controller, a peripheral bus, and a local bus using any of a variety of bus architectures. Other busses may be present, e.g., as described below with reference to FIG. 2. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as Microsoft Corporation's Windows® 2000, formerly Windows NT®, operating system). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While the present invention is primarily described with respect to the Windows® 2000 operating system and ACPI, those skilled in the art will appreciate that other operating systems and/or configuration management systems may implement and benefit from the present invention.

Exemplary Bus Architecture

In general, contemporary computer systems contain a collection of busses. For example, as represented in a typical mid-range server of FIG. 2, the processor 21 and memory 22 are connected to the CPU bus 23, as is at least one I/O Bridge, e.g., $60_1$-$60_3$. I/O Bridges (e.g., $60_1$, $60_2$ and $60_3$) each generate I/O Busses (e.g., 62-65), which in turn may have I/O Devices $68_1$-$68_n$ and other I/O Bridges e.g., 70 connected thereto. Note that in FIG. 2, there is only one processor 21 and three root I/O Bridges $60_1$-$60_3$ shown, however as can be readily appreciated, other machines may have greater or fewer numbers of such components.

When a processor such as the processor 21 wants to read or write from main memory 22 or any of the I/O Devices $68_1$-$68_n$, the processor 21 generates a read or write cycle, respectively, on the CPU Bus 23. If the processor is one that that addresses both I/O and memory, (such as a 386-compatible microprocessor manufactured by Intel® Corporation), the cycles on the CPU bus 23 can be of one of two types, memory or I/O, (although other "special" cycle types exist, not described herein for purposes of simplicity). In addition to a type, cycles contain an address and a byte length. Thus, for example, one cycle may be a four-byte read from memory address 0x7a32c, while another cycle may be a two-byte write to I/O address 0x802. Note that in processors compatible with the Intel® i386 processor, I/O cycles can have addresses between 0 and 0xffff, while memory cycles can have addresses between 0 and 0xffffffff, with some variants going as high as 0x3ffffffff.

A "bus master" is a hardware device or the like that places a cycle on a bus. Frequently, this is the processor 21, however it can also be any of the I/O devices $68_1$-$68_n$ or bridges $60_1$-$60_3$ or 70. When a bus master places a cycle on a bus, some other device responds to the cycle, which is referred to as "decoding the cycle." Generally, the choice about which device responds is made according to the address in the cycle. For example, in FIG. 2, the main memory 22 may be programmed to decode all memory cycles from memory address 0 through address 0x7fffff, such that if the processor 21 issues a one-byte read from address 0x12000, the main memory 22 responds with data. However, if the processor 21 issues a one-byte read from I/O address 0x200, the main memory 22 will not respond, although an I/O device (e.g., $68_3$) may be programmed to respond to such a read cycle.

Bridges move cycles from one bus to another bus. For example, the CPU to PCI Bridge $60_3$ in FIG. 2 may be programmed to decode I/O range 0x7000 through 0x8fff and memory range 0xE0000000 through 0xE7ffffff on CPU Bus 23, and pass the cycles onto PCI Bus 64. In this example, if the CPU 21 issues a one-byte read from I/O address 0x7200, the CPU to PCI Bridge $60_3$ will claim the cycle, and issue the same cycle (as a bus master) on PCI Bus 64. If the I/O Device $68_4$ is programmed to decode 0x7200 through 0x72ff, the I/O device $68_4$ will respond to this cycle with data. The CPU to PCI Bridge $60_3$ will then return this data to the processor 21, completing the original cycle.

Some processors, including most of those not compatible with the Intel i386, can only generate the memory type of cycle. In such processors, all reads and writes from the processor are expressed in terms of memory. However, such machines still contain I/O devices that decode I/O cycles, not memory cycles. In such machines, the CPU to PCI bridges are designed to translate certain memory cycles to I/O cycles, and vice versa, as they pass through the bridge. For example, CPU to PCI Bridge $60_2$ might decode memory cycles 0xE8000000 through 0xEffffff, passing them through the bridge unchanged. But it would also decode memory cycles 0x100020000 through 0x10002ffff, translating them to I/O addresses 0 through 0xffff as it placed them on the PCI bus 65. Note that in the above example, the translation algorithm essentially consists of subtracting 0x100002000 from the address, and changing its type. Thus, in order for a driver to access a device, the driver needs to know what CPU cycles to issue in order to cause an appropriate I/O cycle on the bus that contains the driver's device.

Illustrative Configuration Management System

Figure 3:
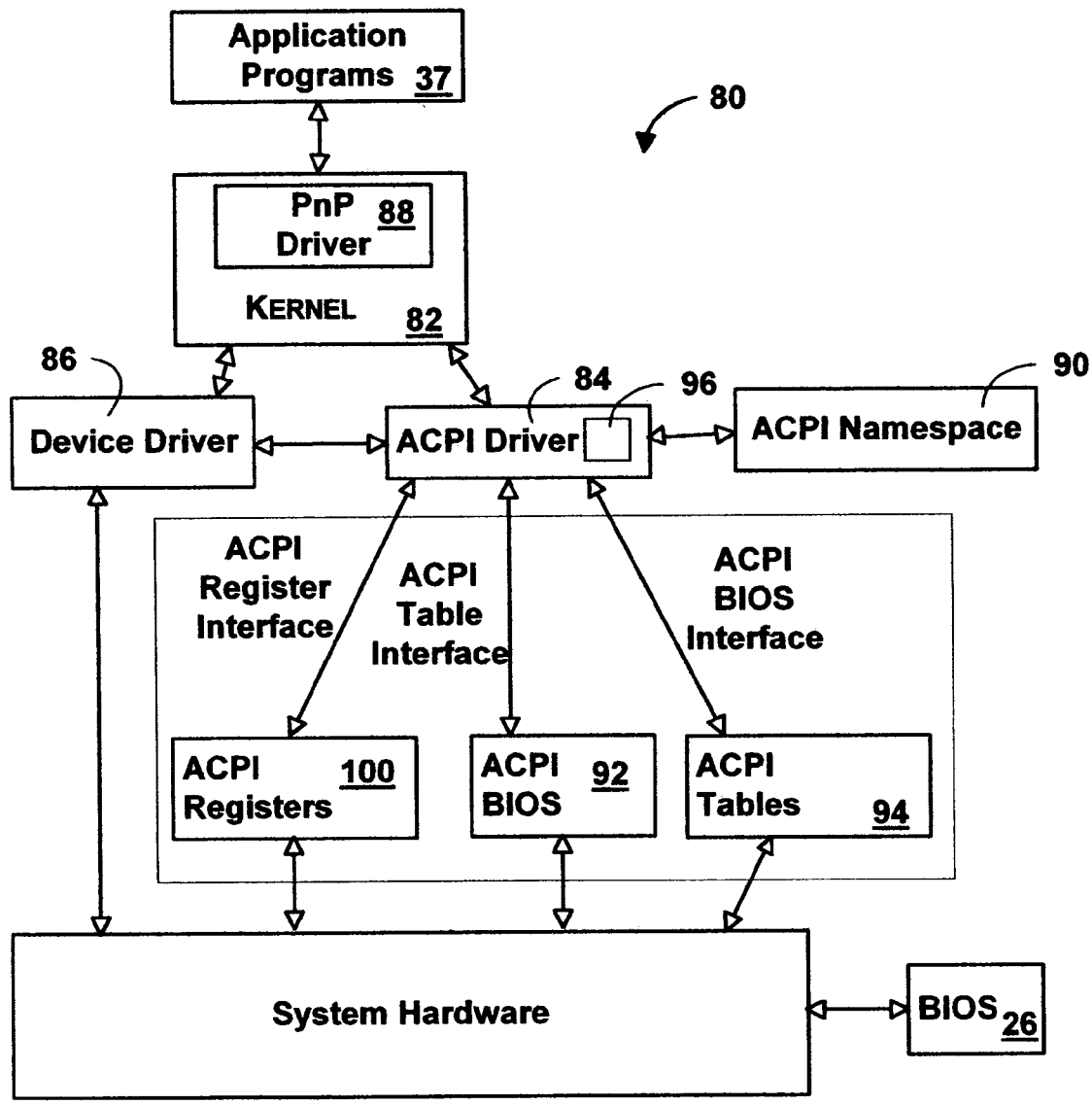
FIG. 3 is a block diagram representing an ACPI system including an ACPI driver and PnP (Plug and Play) component capable of implementing the present invention.

FIG. 3 is a functional block diagram of an ACPI system 80 as implemented in the computer system 20 of FIG. 1. The ACPI system 80 illustrated is one example of a configuration management system that may benefit from the present invention. The present invention is primarily described herein with reference to the ACPI configuration management system, however, there is no intention to limit the present invention to ACPI. Rather, the present invention is intended to operate with and provide benefits with any operating system, architecture, and/or configuration management system.

As shown, the application programs 37 may interface with a kernel 82, which is a part of the operating system 35, generally via application programming interface (API) calls or the like. The kernel 82 can be generally considered as one or more software modules that are responsible for performing many operating system functions. One such function is passing information between the application programs 37 and the lower level components of the ACPI system 80, such as the ACPI driver 84 (described below) and various device drivers (e.g., device driver 86). A driver communicates with other drivers and the operating system components (e.g., an I/O manager), for example in the Windows® 2000 (and Windows NT®) operating systems, by passing I/O request packets, or IRPs.

The kernel 37 also includes (or is associated with) the Plug and Play (PnP) system code referred to herein as the PnP driver 88. The PnP driver 88 comprises one or more software modules, which, among other functions, locates resources including I/O devices, and if necessary, changes the addresses of those resources via arbitration. In accordance with one aspect of the present invention and as described in more detail below, the PnP driver 88 also communicates with the driver stack and the ACPI driver 84 to determine whether bus bridges need translation, and if so, to provide a translator to configure drivers to issue the appropriate cycles to communicate with devices based on the translation. The determination is made external to the HAL based on firmware information. Note that although the PnP driver 88 and the ACPI driver 84 are described as separate components, the operation and functionality thereof may be combined into a single component, and/or distributed among other components. Moreover, it should be noted that while the present invention is described with reference to ACPI and PnP, there is no intent to limit the invention thereto, as those skilled in the art will appreciated that the invention may be implemented in many types of computing environments.

Figure 4:
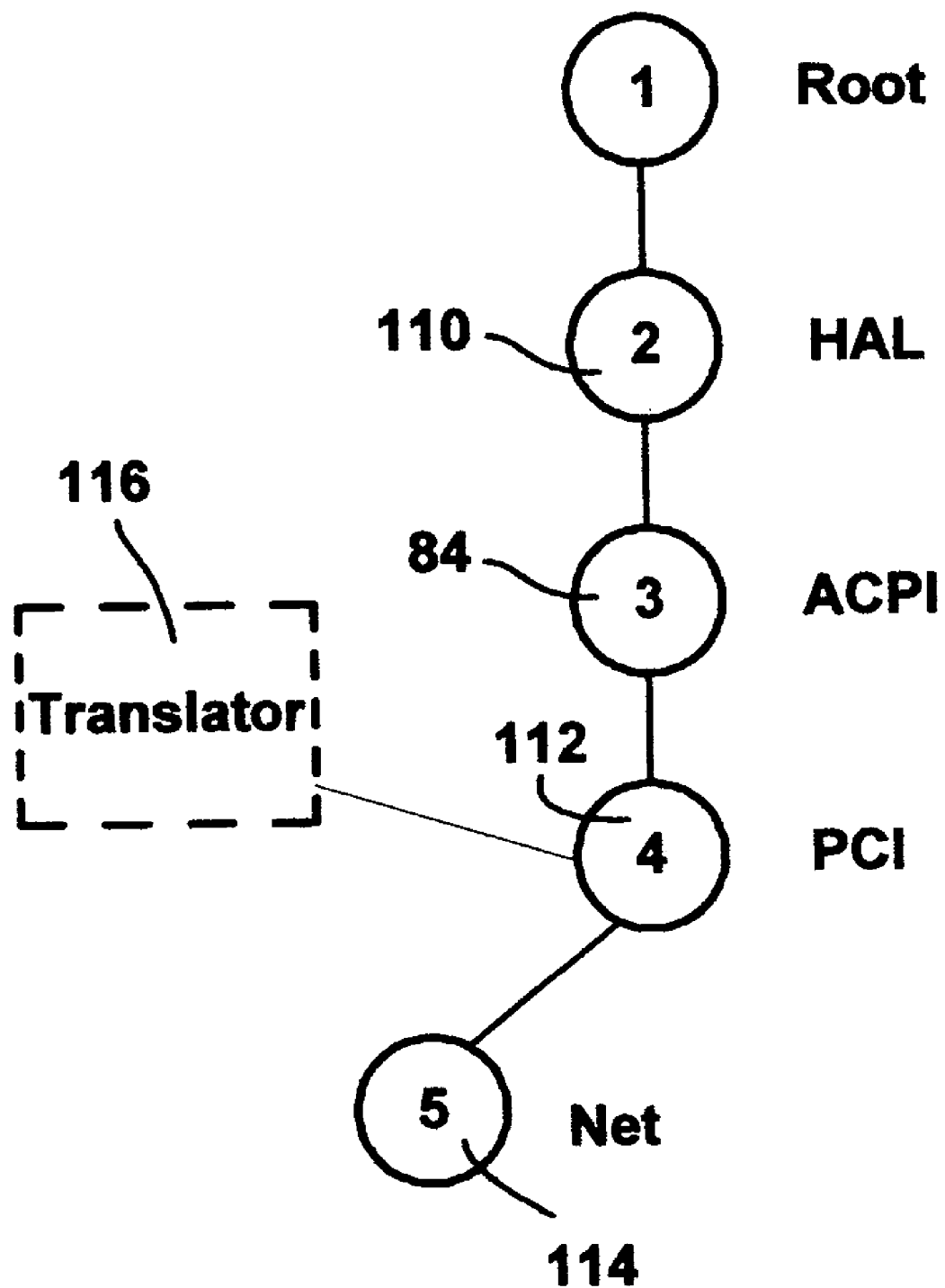
FIG. 4 is a representation of a tree of system components wherein a translator is associated with a bus driver external to the HAL in accordance with the present invention.
Figure 5:
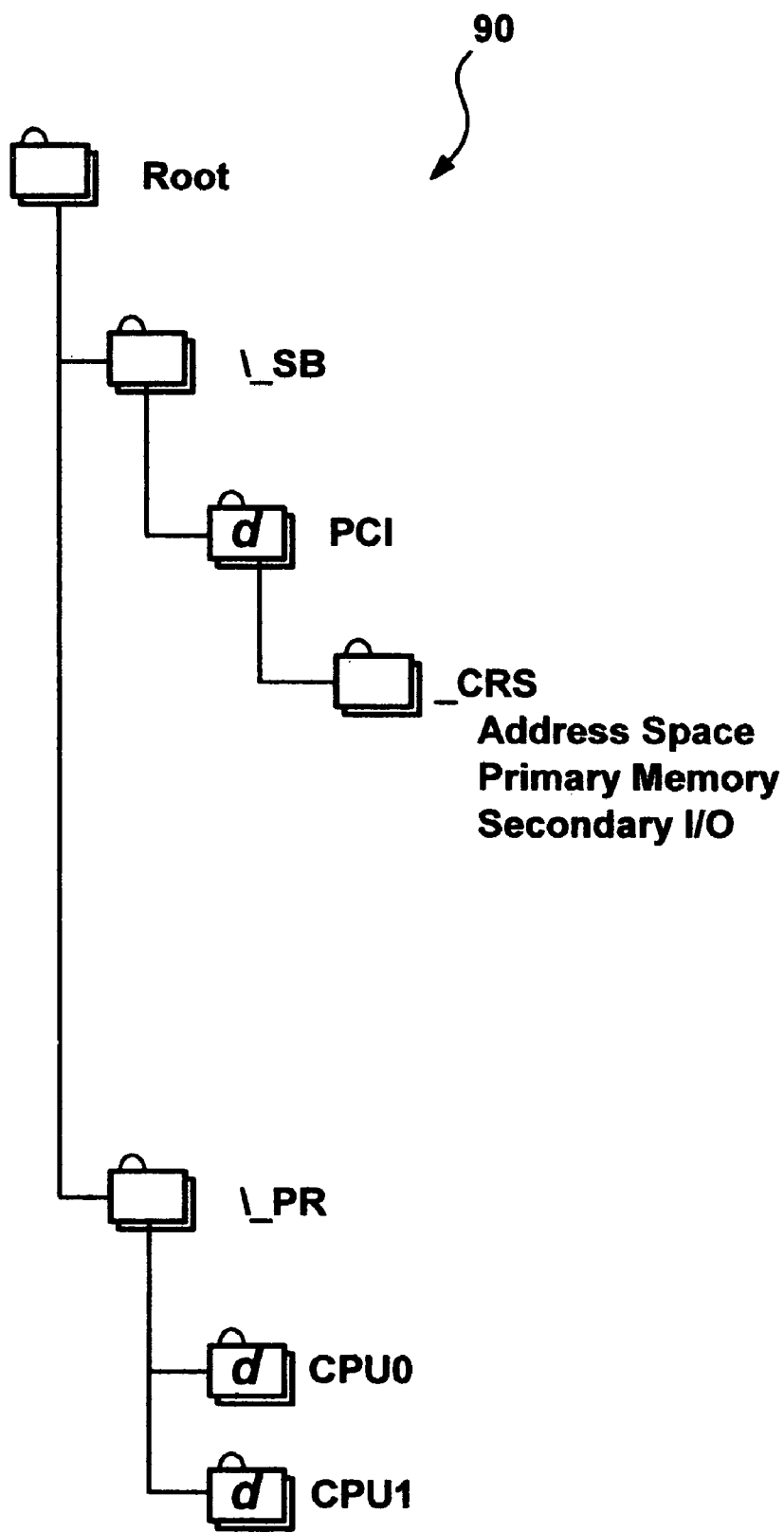
FIG. 5 is a representation of a hierarchical namespace built by the ACPI driver from firmware information to represent a computer system, and accessed thereby to locate translation information in accordance with an aspect of the present invention.

In general, the ACPI driver 84 is a module that controls the functioning of much of the ACPI system 80. The ACPI driver 84 may be supplied as part of the operating system 35 or as a separate component. In the described system, the ACPI driver 84 is loaded during system start-up in a tree, (e.g., as shown in FIG. 4). The responsibilities of the ACPI driver 84 include support for plug and play (PnP). The ACPI driver 84 is responsible for initiating and maintaining the ACPI system 80, such as by populating an ACPI namespace 90 (e.g., part of which is represented in FIG. 5 and described below) at system startup, loading and unloading description blocks from the ACPI namespace 90 at run time, handling certain generic events triggered by ACPI-compliant hardware, and handing off other events to modules registered to handle those events.

The ACPI driver 84 makes use of several components when performing the functions of the ACPI system 80. One component is the ACPI BIOS 92, which refers to the portion of system firmware that is compatible with the ACPI specification. Generally stated, the ACPI BIOS 92 is packaged with the machine code that boots the machine (similar to the BIOS present in most conventional computer systems) and implements interfaces for power and configuration operations, such as sleep, wake, and some restart operations. The ACPI BIOS 92 contains definition blocks used to construct ACPI Tables 94. Note that although the BIOS 26 and the ACPI BIOS 92 are illustrated as separate components in FIG. 3, they may be implemented as one component in the computer system 20.

The ACPI Tables 94, generally known as Differentiated Definition Blocks (DDBs), are composed of as few as one, but most likely many, definition blocks that contain data and/or control methods. Each set of data and/or control methods defines and provides access to a respective hardware device. The tables include header data structures that contain information about what the block contains, for example, whether it is a Differentiated System Description Table (DSDT) or a Secondary System Descriptor Table (SSDT). Each table (SSDT or DSDT) contains only one Definition Block. One such definition block, known as a Differentiated System Description Table (DSDT) describes the base computer system, that is, the DSDT contains a Differentiated Definition Block (DDB), which describes the root system. The DSDT is like other Data blocks, except that it cannot be unloaded. Other definition blocks may be provided to describe additional ACPI devices.

The definition blocks are written in an interpreted language called ACPI Machine Language (AML), the interpretation of which is performed by an AML interpreter 96 within the ACPI driver 84. ACPI registers 100 are a constrained part of the hardware interface, described (at least in location) by the ACPI Tables 94. For a more detailed discussion of the ACPI tables 94, definition blocks, and other functions performed by the ACPI driver 84, refer to Sections 5 and 16 of the publicly-available ACPI Specification Version 1.0 et seq., which are hereby incorporated by reference in their entireties.

FIG. 5 is a graphical representation of part of one possible ACPI namespace 90 which is created hierarchically, and essentially represents a working version of the ACPI tables 94. The ACPI Namespace 90 is a hierarchical tree structure in protected memory that contains named objects which describe the ACPI-aware devices installed in the computer system 20. The objects may be data objects, control method objects, bus/device package objects, or the like. The information in the ACPI namespace 90 comes from the Differentiated Data Blocks (DDB) stored in the ACPI BIOS 92. The DSDT contains a Differentiated Definition Block (DDB). As mentioned, at boot time, the operating system 35 (via the ACPI driver 84) reads the ACPI tables 94 from the ACPI BIOS 92 and loads certain definition blocks (e.g., the DDBs) from the ACPI tables 94 to construct the ACPI namespace 90. The ACPI driver 84 may dynamically change the contents of the ACPI namespace 90 during run time operations by loading and/or unloading additional definition blocks from the ACPI Tables 94.

Shown in FIG. 5 is one illustrative ACPI namespace 90, containing a namespace root, and illustrative branches under the root, along with other objects. For example, under the root is a processor tree namespace \_PR. Processor objects, such as the Processor objects CPU0 and CPU1, are defined under the processor tree \_PR namespace. For more information about processor objects, see Section 8 of the ACPI. Specification.

The \_SB namespace includes namespace objects that define ACPI-compliant components attached to the system bus. One example of such a namespace object is the PCI bus namespace object. As described in more detail below, hierarchically beneath the PCI device object is an ACPI \_CRS (current resource settings) object associated with each bridge. The \_CRS object is populated by structures that describe the ranges of I/O and Memory that pass through a CPU to PCI bridge.

Figure 6:
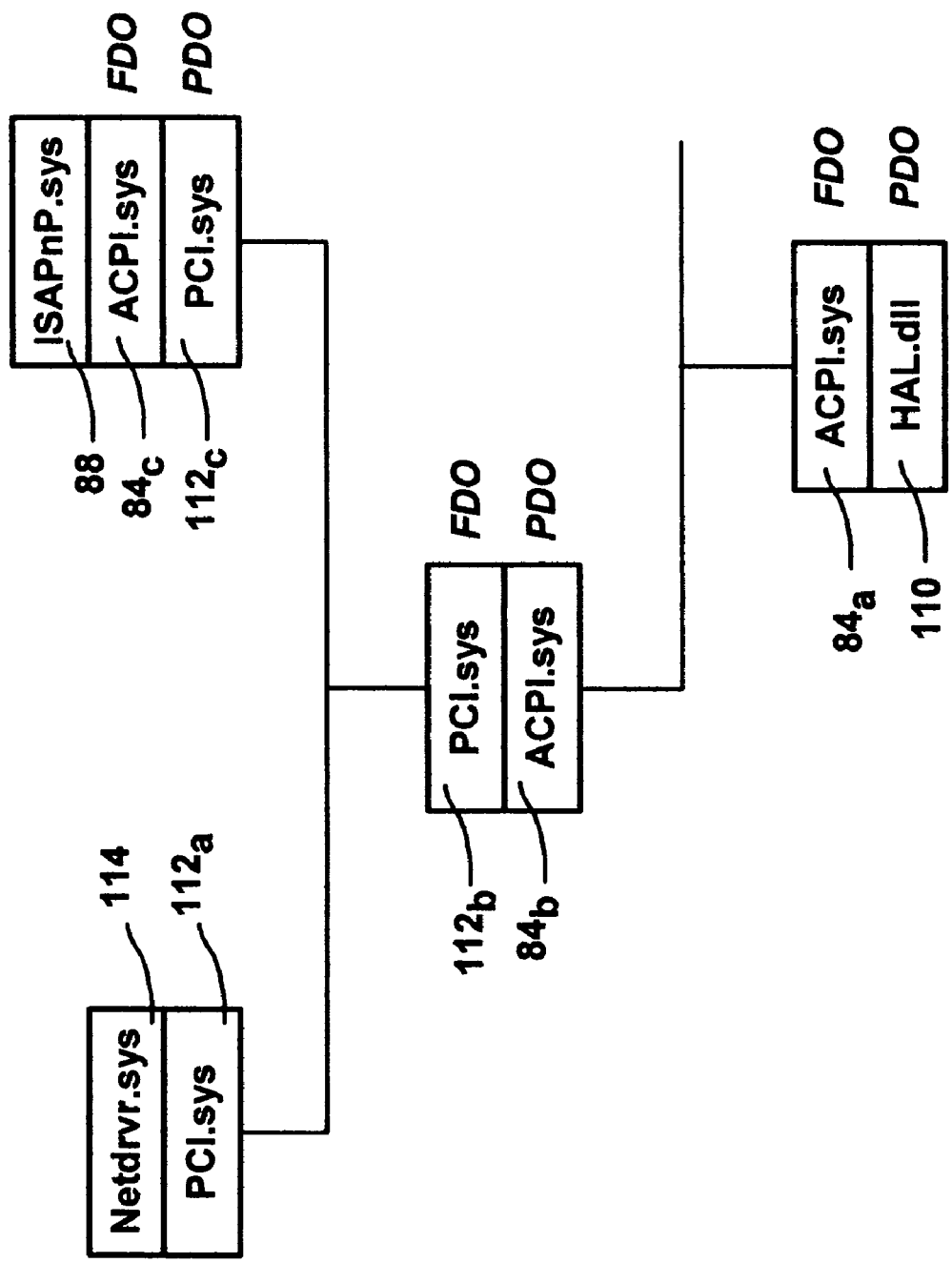
FIG. 6 is a partial representation of drivers in an ACPI system.

As generally shown in FIG. 6, for each device described in the ACPI namespace 90, the ACPI driver 84 creates either a filter Device Object (filter DO) or a Physical Device Object (PDO). Note that FIG. 6 is only a partial representation, as ACPI loads itself into every device stack of which it is aware. If the device is capable of being enumerated by an element of another subsystem, such as a Plug-n-Play subsystem, that element of the other subsystem creates a PDO for the device and the ACPI driver 64 puts a filter DO on top of the PDO. If the ACPI namespace 90 is the only possible enumeration mechanism, the ACPI driver 84 creates the PDO. ACPI provides various features to the device stack by means of these device objects. For more information on filter DOs, PDOs and Functional DOs (FDOs), refer to the Microsoft Windows® 2000 Driver Development Kit, available from the Microsoft Corporation of Redmond, Wash., and incorporated by reference herein.

Windows Driver Model

In accordance with one aspect of the invention and as generally represented in FIG. 4, an ACPI-compliant implementation of a HAL 110 is provided that does not enumerate the CPU to PCI bridges in the machine, but instead enumerates the ACPI driver 84, which is responsible for examining and interpreting the ACPI firmware. Note that this implies that the HAL is not the bus driver for these devices, i.e., the HAL is neither aware of nor is responsible for detecting/configuring these devices.

In turn, the ACPI driver 84 enumerates the CPU to PCI bridges that are described in the ACPI firmware, such as the PCI bridge driver 112, paying special attention to the ACPI \_CRS object associated with each of these devices. As mentioned above and as represented in the namespace of FIG. 5, each \_CRS object is populated by structures that may describe the ranges of I/O and Memory that pass through a CPU to PCI bridge.

The device driver, e.g., the net driver 114 that controls the I/O Device (e.g., 68$_6$) in the previous examples needs to know how to address the device. AS described below, the Windows driver model (WDM) will provide for this by passing the base address of the device 68$_6$ to the device driver 114 in an IRP, i.e., as part of IRP_MJ_PNP—IRP_MN_START_DEVICE. The following table, TABLE1, based on the Windows® 2000 DDK, Setup, Plug & Play, Power Management—Reference—2.0 Plug and Play IRPs, describes the IRP_MN_START_DEVICE IRP:

TABLE 1

IRP_MN_START_DEVICE
All proper PnP drivers must handle this IRP.
When Sent:

TABLE 1-continued

This IRP is sent by the PnP Manager after it has assigned hardware resources, if any, to the device. The device may have been recently enumerated and is being started for the first time, or the device may be restarting after being stopped for resource rebalancing.
    Sometimes the PnP Manager sends an IRP_MN_START_DEVICE to a device that is already started, supplying a different set of resources than the device is currently using. A driver initiates this action by calling IoInvalidateDeviceState, and responding to the subsequent IRP_MN_QUERY_PNP_DEVICE_STATE request with the PNP_RESOURCE_REQUIREMENTS_CHANGED flag set. For example, a bus driver might use this mechanism to open a new aperture on a PCI-to-PCI bridge.
    The PnP Manager sends this IRP at IRQL PASSIVE_LEVEL in the context of a system thread.
    Input:
        Parameters.StartDevice.AllocatedResources points to a CM_RESOURCE_LIST describing the hardware resources that the PnP Manager assigned to the device. This list contains the resources in raw form. Use the raw resources to program the device.
        Parameters.StartDevice.AllocatedResourcesTranslated points to a CM_RESOURCE_LIST describing the hardware resources that the PnP Manager assigned to the device. This list (described below) contains the resources in translated form. Use the translated resources to connect the interrupt vector, map I/O space, and map memory.

The following table, TABLE2, sets forth the CM_RESOURCE_LIST describing the hardware resources that the PnP Manager assigned to the device:

TABLE 2

```
CM_RESOURCE_LIST
typedef struct _CM_RESOURCE_LIST {
    ULONG Count;
    CM_FULL_RESOURCE_DESCRIPTOR List[1];
} CM_RESOURCE_LIST, *PCM_RESOURCE_LIST;
        The CM_RESOURCE_LIST structure specifies all of the
system hardware resources assigned to a device.
        Members
        Count
        The number of elements contained in the List array. For
WDM drivers, this value is always 1.
        List
        An array of CM_FULL_RESOURCE_DESCRIPTOR structures.
```

The TABLE3 sets forth a CM_FULL_RESOURCE_DESCRIPTOR, an array of which may be specified in the RESOURCE_LIST structure (TABLE2):

TABLE 3

```
CM_FULL_RESOURCE_DESCRIPTOR
typedef struct _CM_FULL_RESOURCE_DESCRIPTOR {
    INTERFACE_TYPE InterfaceType;
    ULONG BusNumber;
    CM_PARTIAL_RESOURCE_LIST PartialResourceList;
} CM_FULL_RESOURCE_DESCRIPTOR,
*PCM_FULL_RESOURCE_DESCRIPTOR;
        The CM_FULL_RESOURCE_DESCRIPTOR structure
specifies a set of system hardware resources of various types,
assigned to a device that is connected to a specific bus. This
structure is contained within a CM_RESOURCE_LIST structure.
        Members
        InterfaceType
            Specifies the type of bus to which the device is
connected. This must be one of the types defined by
INTERFACE_TYPE, in wdm.h or ntddk.h. (Not used by WDM
drivers.)
        BusNumber
```

TABLE 3-continued

```
            The system-assigned, driver-supplied, zero-based
number of the bus to which the device is connected. (Not
used by WDM drivers.)
        PartialResourceList
            A CM_PARTIAL_RESOURCE_LIST structure.
```

TABLE4 describes the CM_PARTIAL_RESOURCE_LIST structure (set forth in TABLE3):

TABLE 4

```
CM_PARTIAL_RESOURCE_LIST
typedef struct _CM_PARTIAL_RESOURCE_LIST {
    USHORT Version;
    USHORT Revision;
    ULONG Count;
    CM_PARTIAL_RESOURCE_DESCRIPTOR PartialDescriptors[1];
} CM_PARTIAL_RESOURCE_LIST,
*PCM_PARTIAL_RESOURCE_LIST;
        The CM_PARTIAL_RESOURCE_LIST structure specifies a set
of system hardware resources, of various types, assigned to
a device. This structure is contained within a
CM_FULL_RESOURCE_DESCRIPTOR structure.
    Members
    Version
    The version number of this structure. This value should be
1.
    Revision
    The revision of this structure. This value, should be 1.
    Count
    The number of elements contained in the PartialDescriptors
array. For WDM drivers, this value is always 1.
    PartialDescriptors
        An array of CM_PARTIAL_RESOURCE_DESCRIPTOR
        structures.
```

Table 5 describes the CM_PARTIAL_RESOURCE_LIST descriptor (of TABLE 4):

TABLE 5

```
CM_PARTIAL_RESOURCE_DESCRIPTOR
typedef struct _CM _PARTIAL_RESOURCE_DESCRIPTOR {
    UCHAR Type;
    UCHAR ShareDisposition;
    USHORT Flags;
    union {
        struct {
            PHYSICAL_ADDRESS Start;
            ULONG Length;
        } Generic;
        struct {
            PHYSICAL_ADDRESS Start;
            ULONG Length;
        } Port;
        struct {
            ULONG Level;
            ULONG Vector;
            ULONG Affinity;
        } Interrupt;
        struct {
            PHYSICAL_ADDRESS Start;
            ULONG Length;
        } Memory;
        struct {
            ULONG Channel;
            ULONG Port;
            ULONG Reserved1;
        } Dma;
        struct {
            ULONG Data[3];
        } DevicePrivate;
        struct {
            ULONG Start;
            ULONG Length;
```

TABLE 5-continued

```
        ULONG Reserved;
    } BusNumber;
    struct {
        ULONG DataSize;
        ULONG Reserved1;
        ULONG Reserved2;
    } DeviceSpecificData;
  } u;
} CM_PARTIAL_RESOURCE_DESCRIPTOR,
*PCM_PARTIAL_RESOURCE_DESCRIPTOR;
```
The CM_PARTIAL_RESOURCE_DESCRIPTOR structure
specifies one or more system hardware resources, of a single
type, assigned to a device. This structure is used to create an
array within a CM_PARTIAL_RESOURCE_LIST structure.
Members
Type
    Identifies the resource type. The constant value
specified for Type indicates which structure within the u
union is valid, as indicated in the following table. (These
flags are used within both CM_PARTIAL_RESOURCE_DESCRIPTOR
and IO_RESOURCE_DESCRIPTOR structures, except
where noted.)

| Type Value | u Member Substructure |
|---|---|
| CmResourceTypePort | u.Port |
| CmResourceTypeInterrupt | u.Interrupt |
| CmResourceTypeMemory | u.Memory |
| CmResourceTypeDma | u.Dma |
| CmResourceTypeDevicePrivate | u.DevicePrivate |
| CmResourceTypeBusNumber | u.BusNumber |
| CmResourceTypeDeviceSpecific | u.DeviceSpecificData (Not used within IO_RESOURCE_DESCRIPTOR.) |
| CmResourceTypePcCardConfig | u.DevicePrivate |
| CmResourceTypeMfCardConfig | u.DevicePrivate |
| CmResourceTypeConfigData | Reserved for system use. |
| CmResourceTypeNonArbitrated | Not used. |

In the first example in the busses section above, the Parameters.StartDevice.AllocatedResources for I/O Device $68_6$ would contain a single CM_PARTIAL_RESOURCE_DESCRIPTOR with the following data:

```
Type - CmResourceTypePort
ShareDisposition - CmResourceShareDeviceExclusive
Flags - CM_RESOURCE_PORT_16_BIT_DECODE
u.Port.Start - 0x7200
u.Port.Length - 0x100
```

Parameters.StartDevice.AllocatedResourcesTranslated contains the same resource, but from the point of view of the processor 21. In the first example, the CPU to PCI Bridge $60_2$ just passes cycles through without modifying them. So AllocatedResourcesTranslated contains the same values as AllocatedResources:

```
Type - CmResourceTypePort
ShareDisposition - CmResourceShareDeviceExclusve
Flags - CM_RESOURCE_PORT_16_BIT_DECODE
u.Port.Start - 0x7200
u.Port.Length - 0x100
```

In the second example above, the Parameters.StartDevice.AllocatedResources for I/O Device $68_6$ contains exactly the same thing, since from the point of view of the device, nothing is different:

```
Type - CmResourceTypePort
ShareDisposition - CmResourceShareDeviceExclusive
Flags - CM_RESOURCE_PORT_16_BIT_DECODE
u.Port.Start - 0x7200
u.Port.Length - 0x100
```

Note however, that Parameters.StartDevice.AllocatedResourcesTranslated contains something very different, as the cycles that the processor must place on the bus to address the device are different from the cycles that the device will ultimately decode:

```
Type - CmResourceTypeMemory
ShareDisposition - CmResourceShareDeviceExclusive
Flags - 0
u.Memory.Start - 0x100027200
u.Memory.Length - 0x100
```

Prior to the present invention, in one implementation, translation was statically defined for an entire class of machine and was entirely handled by the HAL, more particularly, in the function HalTranslateBusAddress. In another implementation, the PnP Manager and the WDM bus drivers provide similar services with the WDM interface TRANSLATOR_INTERFACE. Even with this service, the HALs that existed implemented the bus drivers that the PnP Manager queried for this interface, i.e., the code was still in the HAL.

TABLE 6

```
//
// The directions translation can take place in
//
typedef enum _RESOURCE_TRANSLATION_DIRECTION {
    TranslateChildToParent,
    TranslateParentToChild
} RESOURCE_TRANSLATION_DIRECTION;
//
// Translation functions
//
typedef
NTSTATUS
(*PTRANSLATE_RESOURCE_HANDLER) (
    IN PVOID Context,
    IN PCM_PARTIAL_RESOURCE_DESCRIPTOR Source,
    IN RESOURCE_TRANSLATION_DIRECTION Direction,
    IN ULONG AlternativesCount, OPTIONAL
    IN IO_RESOURCE_DESCRIPTOR Alternatives[ ], OPTIONAL
    IN PDEVICE_OBJECT PhysicalDeviceObject,
    OUT PCM_PARTIAL_RESOURCE_DESCRIPTOR Target
);
typedef
NTSTATUS
(*PTRANSLATE_RESOURCE_REQUIREMENTS_HANDLER) (
    IN PVOID Context,
    IN PIO_RESOURCE_DESCRIPTOR Source,
    IN PDEVICE_OBJECT PhysicalDeviceObject,
    OUT PULONG TargetCount,
    OUT PIO_RESOURCE_DESCRIPTOR *Target
);
//
// Translator Interface
//
typedef struct _TRANSLATOR_INTERFACE {
    USHORT Size;
    USHORT Version;
    PVOID Context;
    PINTERFACE_REFERENCE InterfaceReference;
    PINTERFACE_DEREFERENCE InterfaceDereference;
```

TABLE 6-continued

```
    PTRANSLATE_RESOURCE_HANDLER TranslateResources;
    PTRANSLATE_RESOURCE_REQUIREMENTS_HANDLER
TranslateResourceRequirements;
} TRANSLATOR_INTERFACE, *PTRANSLATOR_INTERFACE;
```

Resource Translation

As described above, ACPI, among other things, allows the machine to provide a description of itself, packaged inside its own firmware. An ACPI compliant machine describes the CPU to PCI bridges using objects, one of which is represented in the namespace 90 of FIG. 5.

In accordance with one aspect of the present invention, the ACPI driver enumerates the CPU to PCI bridges that are described in the ACPI firmware, examining the ACPI _CRS object associated with each of these devices. As represented in the TABLE7 below, (taken from Section 6.4 of the ACPI 1.0b specification), the _CRS object, which may be in one of the address space descriptors (Type 1, Large Item Name 0x7), used to report resource usage in a an address space (like memory and I/O) via structures, including those in bytes numbered 10 through 25 that describe the ranges of I/O and memory that pass through a CPU to PCI bridge:

TABLE 7

| Offset | Field Name | Definition |
|---|---|---|
| Byte 0 | DWORD Address Space Descriptor | Value = 10000111B (Type = 1, Large item name = 0x7) |
| Byte 1 | Length, bits[7:0] | Variable: Value = 23 (minimum) |
| Byte 2 | Length, bits[15:8] | Variable: Value = 0 (minimum) |
| Byte 3 | Resource Type | Indicates which type of resource this descriptor describes. Defined values are:<br>0 Memory range<br>1 I/O range<br>2 Bus number range<br>3–255 Reserved |
| Byte 4 | General Flags | Flags that are common to all resource types:<br>Bits[7:4] Reserved, must be 0<br>Bit[3] _MAF:<br>1: The specified max address is fixed.<br>0: The specified max address is not fixed and can be changed.<br>Bit[2] _MIF:<br>1: The specified min address is fixed.<br>0: The specified min address is not fixed and can be changed.<br>Bit[1] _DEC:<br>1: This bridge subtractively decodes this address (top level bridges only)<br>0: This bridge positively decodes this address.<br>Bit[0]<br>1: This device consumes this resource.<br>0: This device produces and consumes this resource. |
| Byte 5 | Type Specific Flags | Flags that are specific to each resource type. The meaning of the flags in this field depends on the value of the Resource Type field (see above) |
| Byte 6 | Address space granularity, _GRA bits[7:0] | A set bit in this mask means that this bit is decoded. All bits less significant than the most significant set bit must all be set. (i.e. The value of the full Address Space Granularity field (all 32 bits) must be a number $(2^n - 1)$ |
| Byte 7 | Address space granularity, _GRA bits[15:8] | |
| Byte 8 | Address space granularity, _GRA bits [23:16] | |
| Byte 9 | Address space granularity, _GRA bits [31:24] | |
| Byte 10 | Address range minimum, _MIN bits [7:0] | For bridges that translate addresses, this is the address space on the primary side of the bridge. |
| Byte 11 | Address range minimum, _MIN bits [15:8] | |
| Byte 12 | Address range minimum, _MIN bits [23:16] | |
| Byte 13 | Address range minimum, _MIN bits [31:24] | |
| Byte 14 | Address range maximum, _MAX bits [7:0] | For bridges that translate addresses, this is the address space on the primary side of the bridge. |
| Byte 15 | Address range maximum, _MAX bits [15:8] | |
| Byte 16 | Address range maximum, _MAX bits [23:16] | |
| Byte 17 | Address range maximum, _MAX bits [31:24] | |
| Byte 18 | Address Translation offset, _TRA bits [7:0] | For bridges that translate addresses across the bridge, this is the offset that must be added to the address on the primary side to obtain the address on the secondary side. Non-bridge devices must list 0 for all Address Translation offset bits. |
| Byte 19 | Address Translation offset, _TRA bits [15:8] | |
| Byte 20 | Address Translation offset, _TRA bits [23:16] | |
| Byte 21 | Address Translation offset, _TRA bits [31:24] | |
| Byte 22 | Address Length, _LEN, bits [7:0] | |
| Byte 23 | Address Length, _LEN, bits [15:8] | |
| Byte 24 | Address Length, _LEN, bits [23:16] | |
| Byte 25 | Address Length, _LEN, bits [31:24] | |
| Byte 26 | Resource Source Index | (Optional) Only present if Resource Source (below) is present. This field gives an index to the specific resource |

TABLE 7-continued

| Offset | Field Name | Definition |
|---|---|---|
| String | Resource Source | descriptor that this device consumes from in the current resource template for the device object pointed to in Resource Source. (Optional) If present, the device that uses this descriptor consumes its resources from the resources produced by the named device object. If not present, the device consumes its resources out of a global pool. If not present, the device consumes this resource from its hierarchical parent. |

Note that other descriptors that can exist in a _CRS that contain resource translations. Further, note that the format for a _CRS is more complex than represented in TABLE7, as a minimal, non-empty _CRS contains a START and an END descriptor and at least one other descriptor, as described in Section 6.4 of the ACPI spec.

The invention implements the following two functions, which comply with the definition of TRANSLATOR_INTERFACE above:

```
NTSTATUS
TranslateBridgeResources(
    IN PVOID Context,
    IN PCM_PARTIAL_RESOURCE_DESCRIPTOR Source,
    IN RESOURCE_TRANSLATION_DIRECTION Direction,
    IN ULONG AlternativesCount, OPTIONAL
    IN IO_RESOURCE_DESCRIPTOR Alternatives[ ], OPTIONAL
    IN PDEVICE_OBJECT PhysicalDeviceObject,
    OUT PCM_PARTIAL_RESOURCE_DESCRIPTOR Target
    );
NTSTATUS
TranslateBridgeRequirements(
    IN PVOID Context,
    IN PIO_RESOURCE_DESCRIPTOR Source,
    IN PDEVICE_OBJECT PhysicalDeviceObject,
    OUT PULONG TargetCount,
    OUT PIO_RESOURCE_DESCRIPTOR *Target
    );
```

The ACPI driver 84 exports the functions to the PnP Manager by responding to the IRP_MN_QUERY_INTERFACE IRP. The Source arguments in the functions take device resources, like the I/O range 0x7200 through 0x72ff used in the above examples, and convert them into new resources that the processor 21 can use to control the device. It does this by examining the _TRA fields in the ACPI structures (as described in TABLE7 above) and applying any implied translations to the WDM resource structures. These functions are thus used to configure a resource (e.g., device driver) at the time that the device driver is brought into service such that the resource will issue appropriate cycles that cause correspondingly appropriate I/O cycles on the bus that contains the driver's device, i.e., the resource's output will be translated from a processor-relative point of view to an I/O-bus-relative point of view.

Figure 7:
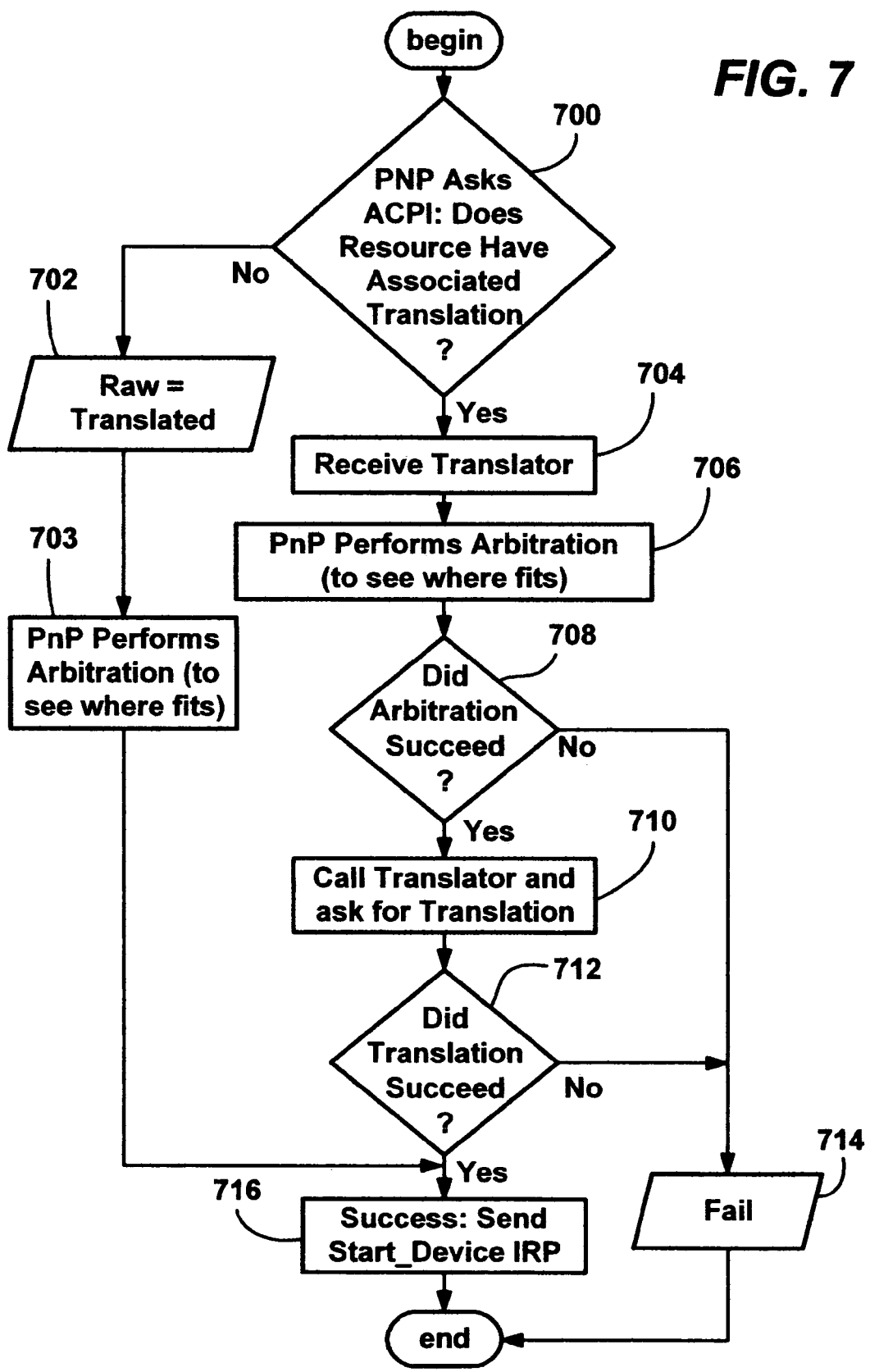
FIG. 7 is a flow diagram generally representing steps taken by a PnP component to locate resources needing translators in accordance with one aspect of the present invention.
Figure 8:
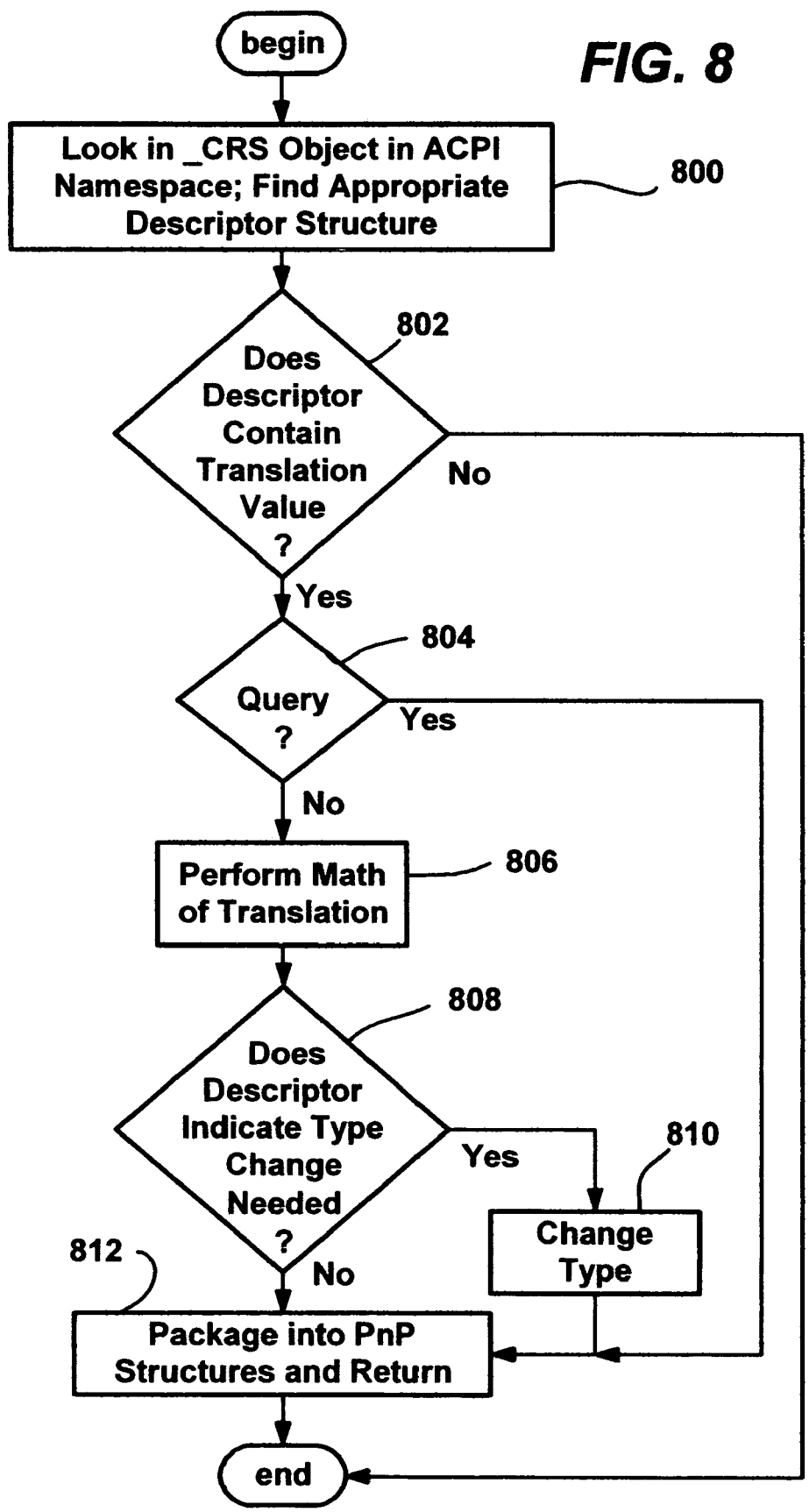
FIG. 8 is a flow diagram generally representing steps taken by an ACPI component to determine whether a resource needs translation, and also to optionally perform the translation, in accordance with one aspect of the present invention.

Turning now to an explanation of the operation of the present invention with particular reference to the flow diagrams of FIGS. 7 and 8, FIG. 7 represents the general logic performed by the kernel (PnP driver 88) at startup to locate resources requiring translators. To this end, at step 700, for a given resource, the PnP driver 88 sends an IRP_MN_QUERY_INTERFACE directed to the device. If the device is described in the ACPI namespace, then ACPI creates a device object and attaches it to the Physical Device Object (PDO) for the specific device, whereby the ACPI driver 84 will receive the IRP, and in response, determine whether the resource has an associated translator. The operation of the ACPI driver 84 to make this determination is described below with reference to FIG. 8. If no translation is found by the ACPI driver, step 700 branches to step 702 wherein no translation is needed, i.e., the raw (bus-relative) address equals the translated (processor-relative) address, in both directions. Note that at step 703 arbitration may take place (as generally described below) to determine where to locate such a device, and a start device IRP (IRP_MN_START_DEVICE) will be sent to such a driver at step 716. Further, note that there may be other translations further up the device tree that need to take place before the start can be sent.

If an associated translation is found, the ACPI driver 84 returns a table of translator functions to the PnP driver 88 (step 704). The IRP_MN_QUERY_INTERFACE for a translator interface provides the information that will be used to perform the translation, e.g., the table of functions to call to obtain the translation or the translation information itself. For example, as represented in FIG. 4, the translator 116 is associated with the PCI bus driver 112. Note that if the initial translation fails, e.g., the requested address is out of range, then the driver is not started via steps 712 and 714.

The process continues to step 706 where the PnP driver 88 performs an arbitration process to see where the device can fit within the system address space. To this end, the PnP driver 88 sends an IRP_MN_QUERY_RESOURCES IRP to the device driver to determine what resources it is presently consuming, and also an IRP_MN_QUERY_RESOURCE_REQUIREMENTS IRP to find out what the device needs. Note that as a general rule, a device will not be reprogrammed to a new location unless necessary. If the arbitration fails, e.g., because the requirements cannot be satisfied, step 708 branches to step 714 to bypass the starting of the device.

If arbitration is successful, step 710 is executed to call the translator (via the table of functions returned by the ACPI driver at step 704) and ask for a translation, as also described below with respect to FIG. 8. If the translation succeeds, e.g., the value was in a range that could be translated, then step 716 is executed to start the device (IRP_MN_START_DEVICE). Note that there may be other translations further up the device tree that need to take place before the start can be sent.

FIG. 8 generally describes the logic performed in the ACPI driver 84 to respond to the IRPs sent in FIG. 7 by the PnP driver 88. When either the query interface IRP or the request for translation is received, at step 800, the ACPI driver 84 looks in the namespace 90 for the _CRS (current resource) to locate an appropriate descriptor structure (as described above with reference to TABLE7). If the descriptor does not contain translation information, as determined by step 802, then the process ends, returning information to the PnP driver 88 indicating that there is no translator for this particular bus driver.

However, if appropriate translation information is found in the _CRS object, and if this IRP is the query IRP (step 804), then the ACPI driver 84 packages the information into PnP IRP structures and returns the translation information to the PnP driver 88 at step 812. Note that the receipt of this information by the PnP driver 88 corresponds to step 704 of FIG. 7 as described above.

If instead at step 804 of FIG. 8 this is a translation request, (e.g., made via step 708 of FIG. 7, and not via a query interface IRP), then step 806 is further executed to attempt to perform the translation. Also, step 808 determines whether the type has changed from I/O to memory or vice-versa, and if so, step 810 changes the type accordingly. Note that not all translations are I/O to memory, as some translations are memory address to memory address types. The translation information including the (possibly) changed type are then returned to the PnP driver 88 via step 812. In this manner, the PnP driver 88 obtains the information it needs to configure the resource at the time that the resource is brought into service with the information that tells the resource what CPU cycles to issue in order to cause an appropriate I/O cycle on the bus that contains the driver's device. Note that the translation may fail, in which event the PnP driver is informed and does not start the driver, as described above.

As can be readily appreciated, the interaction between the PnP driver 88 and the ACPI driver 84, along with the analysis of the machine description by the ACPI driver 84, enables the translation information to be dynamically obtained external to the HAL. Thus, manufactures may build machines with various resources having various translations occurring in their bus bridges without dependence on the HAL, enabling customized machines.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing system that uses an abstraction layer for abstracting hardware differences among various system architectures from higher layers of software, a computer-implemented method for removing a function of resource translation out of the abstraction layer for enabling machines to be more readily developed and allow cycles to be dynamically determined for each particular piece of hardware in the machine, the computer-implemented method comprising:

obtaining a description of a machine with a plurality of resources that each have a device driver stored on the machine;

determining from the description whether cycles output by a device driver of a resource from the plurality of resources require translation from one bus to another bus, and if so, providing a translator for the device driver; and dynamically configuring the device driver for translating cycles based on the translator such that an appropriate cycle occurs on a bus that includes the driver's device.

2. The method of claim 1 wherein obtaining a description of machine hardware includes reading firmware information.

3. The method of claim 1 wherein determining from the description includes looking for address translation information in the description.

4. The method of claim 1 wherein providing a translator for the resource includes returning a table of functions.

5. The method of claim 1 wherein providing a translator for the resource includes performing a translation.

6. The method of claim 1 wherein providing a translator for the resource includes returning type information.

7. The method of claim 1 wherein the type information corresponds to I/O.

8. The method of claim 1 wherein the type information corresponds to memory.

9. The method of claim 1 further comprising locating the resource.

10. The method of claim 1 wherein configuring the resource based on the translator includes telling the resource what cycles to issue to cause an appropriate I/O cycle on the other bus.

11. The method of claim 1 wherein obtaining a description of machine hardware includes constructing a namespace.

12. The method of claim 10 further comprising starting the resource.

13. The method of claim 11 wherein determining from the description includes analyzing the namespace.

14. The method of claim 13 wherein the machine is described in accordance with ACPI, and wherein determining from the description includes evaluating information in a current resources object.

15. In a computing system that uses an abstraction layer for abstracting hardware differences among various system architectures from higher layers of software, a computer-implemented method for removing a function of resource translation out of the abstraction layer for enabling machines to be more readily developed and allow cycles to be dynamically determined for each particular piece of hardware in the machine, the computer-implemented method comprising:

analyzing a description of a machine to determine whether cycles output by a device driver of a resource require translation from one bus to another bus;

providing a translator for the device driver if the cycles output by the device driver require translation; and dynamically configuring the device driver to output cycles based on translation that will be performed at a bus bridge such that an appropriate cycle occurs on the bus bridge that includes the driver's device.

16. The method of claim 15 further comprising obtaining the description of the machine from firmware information.

17. The method of claim 15 wherein providing a translator for the resource comprises providing a translator to change a memory address.

18. The method of claim 15 wherein providing a translator for the resource comprises providing a translator to change a cycle type.

19. The method of claim 16 further comprising constructing a namespace from the firmware information.

20. In a computing system that uses an abstraction layer for abstracting hardware differences among various system architectures from higher layers of software, a computer program product for implementing a method for removing a function of resource translation out of the abstraction layer for enabling machines to be more readily developed and allow cycles to be dynamically determined for each particular piece of hardware in the machine, the computer program product having stored thereon computer-executable instructions that when implemented cause the computing system to perform the following steps of:

obtaining a description of a machine with a plurality of resources that each have a device driver stored on the machine;

determining from the description whether cycles output by a device driver of a resource require translation from one bus to another bus, and if so, providing a translator for the device driver; and dynamically configuring the device driver for translating cycles based on the translator such that an appropriate cycle occurs on a bus that includes the driver's device.

* * * * *